United States Patent [19]

Weisgerber et al.

[11] 4,000,356
[45] Dec. 28, 1976

[54] PROCESS FOR THE PREPARATION OF THERMOPLASTICALLY WORKABLE FLUORO-OLEFIN POLYMERS

[75] Inventors: Gregor Weisgerber, Konigswinter; Werner Trautvetter, Troisdorf-Spich, both of Germany

[73] Assignee: Dynamit Nobel Aktiengesellschaft, Troisdorf, Germany

[22] Filed: June 18, 1975

[21] Appl. No.: 588,081

Related U.S. Application Data

[63] Continuation-in-part of Ser. No. 367,902, June 7, 1973, Pat. No. 3,937,690.

[30] Foreign Application Priority Data

June 19, 1972 Germany .................... 2229607

[52] U.S. Cl. .............. 526/206; 526/255; 526/250
[51] Int. Cl.$^2$ .......... C08F 114/18; C08F 114/20; C08F 214/20; C08F 214/22
[58] Field of Search ........ 260/92.1, 87.7, 87.5 A, 260/87.5 B, 86.3; 450/698; 526/206

[56] References Cited
FOREIGN PATENTS OR APPLICATIONS
883,850  12/1961  United Kingdom .......... 260/87.7

*Primary Examiner*—Joseph L. Schofer
*Assistant Examiner*—Maria S. Tungol
*Attorney, Agent, or Firm*—Burgess, Dinklage & Sprung

[57] ABSTRACT

An improvement in a process for the preparation of thermoplastically workable fluoro-polyolefins and their copolymers wherein a fluorine containing olefin is polymerized or copolymerized in the aqueous phase in the presence of a water-soluble, radical-forming catalyst and a polymerization regulator, the improvement residing in employing as the polymerization regulator a halogenated hydrocarbon having from one to three carbon atoms and at least three halogen atoms of which at least one is a fluorine atom and at least one is a bromine or iodine atom.

4 Claims, No Drawings

PROCESS FOR THE PREPARATION OF THERMOPLASTICALLY WORKABLE FLUORO-OLEFIN POLYMERS

CROSS-REFERENCE TO RELATED PATENT APPLICATION

This application is a continuation-in-part of application Ser. No. 367,902, filed June 7, 1973, now U.S. Pat. No. 3,939,690, for "Process for the Preparation of Thermoplastically Workable Fluoro-Olefin Polymers."

BACKGROUND OF THE INVENTION

1. Field of the Invention

This invention relates to a process for regulating the molecular weight and physical properties of fluoro-olefin polymers, hereinafter called fluoro-polyolefins. This invention is particularly directed to obtaining polyfluorovinyl compounds which are workable thermoplastically in known manner. This invention is also directed to obtaining copolymers of these fluoro-olefins with other compounds which can be copolymerized with such fluoro-olefins. This invention is directed to the fluoro-polyolefins themselves of which are workable thermoplastically.

2. Discussion of Prior Art

Fluoro-polyolefins such as, for instance, polyvinylidene fluoride ($PVF_2$), polyvinyl fluoride (PVF) or copolymers consisting predominantly of vinylidene fluoride ($VF_2$) or vinyl fluoride (VF) can be used in many fields because of their excellent weather resistance and light stability as well as their good resistance to chemicals, heat and cold. In this connection the polymers having a high molecular weight are used preferably as organosols for coating metals or for making cast sheets. However, for thermoplastic molding, e.g. calendering, extruding or injection molding, products having a medium-high molecular weight are more suitable.

Depending on the polymerization process used, fluoro-olefin polymers have molecular weights of varying size. The result is that the products obtained, which have a high molecular weight, are neither genuinely soluble in known solvents nor thermoplastically workable below their decomposition temperature. In particular, polymers, which are made with water-soluble, free radical initiators in the aqueous phase, with or without additional emulsifier, in a temperature range between 50° and 150° C, have as a rule a molecular weight that is too high for thermoplastic processing. Generally known methods for the reduction of the molecular weight, e.g. increase in the amount of initiator or the polymerization temperature, are without noticeable effect or give rise to undesirable side effects such as, for instance, an impairment of the thermal stability. Therefore, in order to reduce the molecular weight it is necessary to use chain transfer agents—which are also called polymerization regulators.

Some compounds have already been proposed as regulators, for instance, trans-dichloroethylene or isopropanol for the polymerization of vinyl fluoride, isopropanol or ethylene oxide for the polymerization of vinylidene fluoride. All of these compounds have the disadvantage of either regulating too little, i.e, not all of the desirable molecular weights can be attained, or partially inhibiting in addition the polymerization, i.e., the polymerization rate is greatly reduced. Also, some of the known regulators can effect the desired reduction of the molecular weight only in a specific polymerization process, e.g., at high pressure, high speed of agitation, etc., without affecting too much both reaction rate and yield. Other known polymerization regulators such as mercaptans, tetrahydrofuran, chlorinated hydrocarbons and others, interfere in particular with the vinylidene fluoride polymerization to such an extent that a polymerization under mild conditions, e.g, at pressures of less than 100 atmospheres, is practically impossible.

SUMMARY OF THE INVENTION

The problems attendant the prior art are solved by an improved process for the preparation of thermoplastically workable fluoro-polyolefins and their copolymers, wherein fluorine containing monomers are polymerized or copolymerized in the aqueous phase in the presence of water-soluble, radical-forming catalysts and a polymerization regulator wherein the polymerization regulator comprises a halogenated hydrocarbon having one to three carbon atoms and at least three halogen atoms of which at least one is a fluorine atom and at least one is bromine or iodine.

There is now provided a process for polymerizing fluoro-olefins to fluoro-polyolefins, wherein through use of a specific type of polymerization regulator there is obtained fluoro-polyolefins, which can be worked thermoplastically. Moreover, there is provided by the present process a process for polymerizing fluorine containing vinylmonomers in the presence of a regulator wherein the regulator affects the molecular weight distribution beneficially. The polymerization regulator employed pursuant to the invention does not materially inhibit the polymerization reaction. Moreover, the polymerization regulators of the present invention are useful over a broad range of polymerization conditions, e.g., pressure, speed of agitation, temperature and the like.

The partially fluorinated hydrocarbons employed as regulators pursuant to the present invention, also contain at least one bromine or iodine atom. They are employed even in the small amounts as excellent chain transfer agents in the radical polymerization of fluoro-olefins in the aqueous phase. The compounds according to the invention can be considered as having the following formulae:

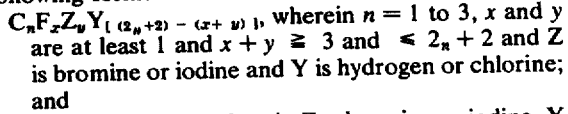

wherein $n = 1$ to 3, $x$ and $y$ are at least 1 and $x + y \geq 3$ and $\leq 2n + 2$ and Z is bromine or iodine and Y is hydrogen or chlorine; and

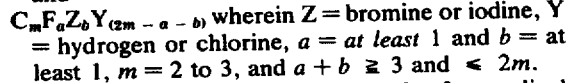

wherein $Z = $ bromine or iodine, $Y = $ hydrogen or chlorine, $a = $ at least 1 and $b = $ at least 1, $m = 2$ to 3, and $a + b \geq 3$ and $\leq 2m$.

The polymerization regulators for the free radical polymerization of fluoro-olefins in the aqueous phase more particularly can be defined by the following formulae:

$CF_3 $ — $CHXY$ where $X = $ H, Cl, Br and $Y = $ Br or I;
$C_nF_{2n}Br_2$, wherein $n = 1$, 2 or 3; and

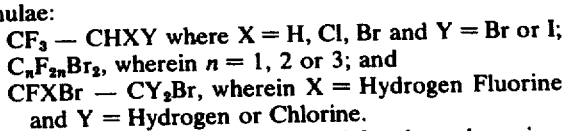

wherein $X = $ Hydrogen Fluorine and $Y = $ Hydrogen or Chlorine.

The regulator amounts required for the polymerization pursuant to the present invention, depend upon the type of regulator, the polymerization process and the desired molecular weight of polymer. Compounds having the formula $CF_3 $ — $CHXY$ have the greatest regulating action. Amounts thereof from 0.05 to 4% by weight, preferably 0.1 to 2% by weight, based upon the weight of the monomer of such compounds are generally required in order to obtain thermoplastically workable polymers. Where the regulator having the formula $C_nF_{2n}Br_2$ or $CFXBr — CH_2Br$ is employed, these compounds are employed in amounts between 0.1 and 4% by weight in order to obtain the desired product. In order to prepare special products having especially low molecular weights, amounts of these regulators up to 10% by weight or even more can be used.

The regulators contemplated pursuant to the present invention include such compounds as $CHFBr_2$, $CF_2Br_2$, $CHF_2Br$, $CF_3Br$, $CBr_3F$, $Cl_3F$, $CHFl_2$, $CF_2I_2$, $CHFBrCl$, $CFBrCl_2$, $CFBr_2Cl$, $CF_2BrCl$, $CF_3CH_2Br$, $CF_3CH_2I$, $CF_3CHClBr$, $CF_3CHCII$, $CF_3CHBr_2$, $CF_3CHBrI$, $CF_2ClCHClBr$, $CF_2ClCHBr_2$, $CF_2ClCH_2I$, $CF_2BrCH_2Br$, $CF_2BrCHBrCl$, $CF_2BrCHBrI$, $CF_2BrCF_2Br$, $CF_2BrCF_2Cl$, $CF_2ICF_2I$.

It is the characteristic of the aforementioned compounds that they do not reduce the reaction rate at all or only very little. The regulators are added in pure form or in solution before the polymerization is started or are gradually dosed in during the polymerization. As solvents, those compounds are suitable that do not inhibit the polymerization and themselves, do not have any regulating effect, e.g., trifluoro trichloroethane, tert. -butanol, dichlorotetrafluoroacetone, dimethyl-sulfoxide, hexafluoro-2,2-propanediol.

Generally speaking, polymerization employing the polymerization regulators can take place at a temperature between 30° and 150° C under a pressure between 20 and 500 atm. The monomer should be present in the reaction vessel in an amount between 5 and 100 grams per hundred grams of water. Additionally, the radical generating catalyst will be present in the polymerization reaction zone in an amount between 0.001 and 1 gram per 100 grams of monomer introduced. It should be understood that none of the above parameters are considered critical and that the polymerization regulators employed pursuant to the claimed invention are useful over a broad range of process parameters and in respect of a wide variety of vinyl olefin polymers and polymerization initiators.

As polymerization initiators, radical-forming, water-soluble polymerization catalysts are used.

Since, under the polymerization conditions, only a few percent by weight of the monomer are soluble in water, a water-solubility of, for instance, 0.01% suffices in view of the small amount of the initiator to be used. Therefore, in accordance with the invention, an initiator having such a low water-solubility is to be defined as water-soluble.

Based on such a low water-solubility of the initiator there is the possibility that, by constant subsequent dissolving of the consumed initiator, there is always present in the aqueous phase the amount necessary for the polymerization.

As suitable initiators there are mentioned for example: azo-bis-iso-butyramidine hydrochloride (AIBA, HCl) and its N-alkyl substitution products, β-hydroxy-alkyl-tert.-butyl peroxides in which the alkyl group consists of 2 to 4 C-atoms, redox systems such as potassium persulfate/sodium dithionite and others.

Monomers that can be polymerized by the process in accordance with the invention are, for instance, vinylidene fluorine ($VF_2$) and/or vinyl fluoride (VF) or mixtures of at least 50 mol % of vinylidene fluoride and/or vinyl fluoride with hexafluoropropylene and/or one or several other polymerizable compounds. As examples for other polymerizable compounds there are mentioned: olefins, e.g. ethylene, propylene, acrylic acid esters, which may be substituted in the α position with a methyl or ethyl group, vinyl esters, e.g. vinyl acetate, and others.

The action of the regulators according to the invention can be determined by:

1. measuring the molecular weight

It was found that non-regulated polymers are generally not soluble or incompletely soluble in known solvents, even at elevated temperature, so that their molecular weights cannot be determined. However, the molecular weights of polymers regulated in accordance with the invention can, as a rule, be directly estimated gel-chromatographically in dimethyl formamide as solvent at 100° C.

2. measuring the solution viscosity

Because of the incomplete solubility of the non-regulated polymers, the solution viscosity (e.g. the reduced viscosity $\eta red$) does not, in all cases, give a quantitative picture of the obtained reduction in the molecular weight. But it is definitely possible to compare the differently regulated products by means of this determination.

3. by methods related to practice for the characterization of the thermoplastic workability such as torsional moment in the Brabender plastograph, melt flow number, melt index and other methods.

These methods permit a genuine comparison between regulated and non-regulated polymers. The tests in the Brabender plastograph are carried out for example in the case of $PVF_2$ with the aid of a roller kneading machine (chrome-plated, chamber volume 60 cm³, 40 rpm) at a chamber temperature of 270° C. After a kneading time of about 10 minutes the torsional moment reaches a constant value that is given as $m$ . kp. The higher the obtained value is, the higher is the molecular weight.

The melt flow number (MFN) is defined as the quotient of the surface area, which a cold-pressed sheet-shaped sample of 1.0 g and 25.4 mm diameter adopts after 5 minutes of pressing at 260° C with a weight of 7.5 Mp, and the original surface area:

$$MFN = \left(\frac{d}{25.4}\right)^2$$

($d$ = diameter of the sample in mm after pressing)

Thus, the higher the numerical value is for the melt flow number, the lower is the molecular weight of the polymer.

The action of the regulators can be clearly shown by each method listed under (1) to (3). The fact that samples having the same melt flow number do by no means always have the same molecular weight or the same solution viscosity is due to the differing molecular weight distribution or the differing molecular structure (e.g. branchings), which depend on the polymerization process.

Which values are to be attained regarding the molecular weight and/or the other characteristic quantities characterizing the molecular weight, depends on the type of polymer and the processing method. Thus, for instance, known commercial $PVF_2$-types, which are suitable for processing by extrusion and injection molding, have a mean molecular weight (numerical mean Mn) of approx. 100,000 to 170,000 and/or a melt flow number between 10 and 18 and/or a Brabender torsional moment at 270° C between 1.5 and 2.3 m. kp and/or a reduced viscosity ($\eta$ red) as 0.5% solution in cyclohexanone at 120° C between 110 and a 180 ml/g.

In order to more fully illustrate the nature of the invention and the manner of practicing the same, the following examples are presented:

EXAMPLES

EXAMPLE 1 (Comparison Example)

1.35 liters of water freed from salt were placed into an autoclave of a capacity of 2 liters which was provided with stirrer and double-wall jacket (for heating and cooling). Another 100 ml of water were provided for dosing in the initiator and emulsifier. Thereupon the autoclave was closed and flushed three times under pressure with vinylidene fluoride. Then, 400 g $VF_2$ were dosed in by means of a diaphragm dosing pump. While stirring (250 rpm) with a wide blade stirrer, the contents were heated to 75° C; a pressure of 150 atmospheres was reached. Thereupon 0.52 AIBA . HCL, dissolved in 20 ml of water, were pumped in. As soon as a noticeable pressure drop occurred, 0.17 g of a fluorine wetting agent of the formula

were passed in as 1% aqueous solution. In order to rinse the pump head and the conduit, the remaining water was pumped in subsequently. The polymerization temperature was 75° C±1° C.

After 90 minutes the pressure had dropped to approx. 20 atmospheres. The autoclave was cooled, depressurized, opened, the $PVF_2$ dispersion was removed, precipitated with NaCl solution, filtered with suction, thoroughly washed with water and dried in the drying chamber at 70° C. Yield: 360 g (90%).

EXAMPLES 2 to 7

The procedure as specified in Example 1 was repeated with the only difference being that the regulators listed in table 1, dissolved in 10 ml of $C_2Cl_3F_3$ in each case, were added before closing the autoclave and before passing in $VF_2$. The reaction times and yields can be seen from table 1.

Table 1

| Example | Regulator | g | % by weight* | Reaction Time min. | Yield g |
|---|---|---|---|---|---|
| 2 | $CF_3CHBrCl$ | 3.8 | 0.95 | 80 | 360 |
| 3 | $CF_3CHBr_2$ | 3.6 | 0.9 | 150 | 340 |
| 4 | $CF_2BrCF_2Br$ | 14 | 3.5 | 150 | 380 |
| 5 | $CF_2BrCF_2Br$ | 7 | 1.75 | 90 | 380 |
| 6 | $CF_3CFBrCF_2Br$ | 14 | 3.5 | 195 | 310 |
| 7 | $CHFBrCH_2Br$ | 3.6 | 0.9 | 270 | 250 |

*based on $VF_2$

EXAMPLE 8 (Comparison Example)

7.8 liters of water freed from salt were introduced into a stirrer autoclave of a capacity of 10 liters, which was provided with a double-wall jacket for heating and cooling. Another 200 ml was provided for dosing in the initiator and emulsifier. The autoclave was closed, the contents were flushed thoroughly three times under pressure with $VF_2$ and were heated to 75° C. Stirring proceeds at 350 rpm (wide blade stirrer). As soon as the temperature had reached a constant level, $VF_2$ was pumped in by means of a diaphragm pump up to a pressure of 55 atmospheres, which required approximately 700 g. Thereupon the polymerization was initiated by sluicing in 2.0 g AIBA . HCl in a small amount of water. As soon as the pressure drop set in, 1.0 g of the fluorine wetting agent specified in Example 1 was dosed in as 1% solution. Rinsing was done by adding the remaining water. Thereupon the pressure was kept at 58 to 62 atmospheres by automatic subsequent pumping in of $VF_2$ until 2.5 kg $VF_2$ had been taken up, which took 2 hours. The autoclave was depressurized in the hot state, cooled, opened, the polymer was removed as dispersion and worked up as specified in Example 1. Yield: 1.65 kg (65%).

EXAMPLES 9 and 11

The procedure of Example 8 was repeated with the exception that the regulator amounts listed in table 2 were added prior to polymerization. This was done after flushing the closed autoclave by opening a screw cap in the cover under which a bore hole of 2mm diameter was disposed. The specified amount of regulator was introduced through the same by means of an injection needle. Care was taken that air could not enter into the autoclave. Subsequently, the screw cap was closed again and work proceeded as specified above (heating etc.). The respective experimental data can be seen from table 2.

Table 2

| Example | Regulator | Amount g | % by weight based on $VF_2$ | Reaction Time min. | Yield kg |
|---|---|---|---|---|---|
| 9 | $CF_3CHBrCl$ | 10 | 0.4 | 150 | 1.6 |
| 10 | $CF_3CH_2I$ | 7.5 | 0.3 | 130 | 1.5 |
| 11 | $CF_2BrCF_2Br$ | 40 | 1.6 | 135 | 1.75 |

EXAMPLE 12 (Comparison Example)

8 liters of water freed from salt, 5 g of tert.-butyl-$\beta$-hydroxyethyl peroxide (BHEP) and 5 g of ammonium perfluorooctanoate (APFO) were placed into an autoclave of a capacity of 10 liters as specified in Example 8. The autoclave was closed, flushed three times with $VF_2$ and heated to 110° C. Stirring was done at 200 rpm. A wide blade stirrer served as the agitator or sitrrer. As soon as the temperature had reached a constant level, $VF_2$ was pumped in until a pressure of 80 atmospheres was attained. The pressure was maintained automatically at 80±2 atmospheres by subsequent pumping in of $VF_2$ until 2.5 kg $VF_2$ had been taken up. The polymerization temperature was maintained to an accuracy of ± 1° C.

After 2 hours the polymerization was completed; the autoclave was depressurized in the hot state, opened after cooling, and the polymer, which was present as dispersion, was worked up as specified in Example 1. Yield 1.75 kg (70%).

EXAMPLES 13 to 16

The procedure was as specified in Example 12 using the regulator quantities listed in table 3, which were added as specified in Examples 9 to 11. The reaction times and yields can be seen from table 3.

Table 3

| Example | Regulator | Amount g | % by weight based on $VF_2$ | Reaction Time min. | Yield kg |
|---|---|---|---|---|---|
| 13 | $CF_3CHBrCl$ | 5 | 0.2 | 130 | 1.6 |
| 14 | $CF_3CHBrCl$ | 4 | 0.16 | 130 | 1.65 |
| 15 | $CF_3CHBrCl$ | 3 | 0.12 | 125 | 1.7 |
| 16 | $CF_3CH_2I$ | 5 | 0.2 | 125 | 1.65 |

EXAMPLE 17 (Comparison Example)

The procedure was as specified in Example 12, the only difference being that tert.-butyl-$\beta$-hydroxypropyl peroxide (BHPP) was used in place of BHEP and that the polymerization temperature was increased to 115° C. Reaction time: 135 min., yield: 1.5 kg.

EXAMPLE 18

Example 17 was repeated at a polymerization temperature of 110° C and with an addition of 10 g (0.4%, based on $VF_2$) $CF_2BrCF_2Br$. Reaction time: 200 min., yield: 1.55 kg.

EXAMPLE 19 (Comparison Example)

An autoclave of a capacity of 2 liters as described in Example 1 was filled with 1.5 liters $H_2O$, 1.6 g APFO and 1.5 g of potassium persulfate and flushed as described in Example 1. Thereupon 400 g $VF_2$ were pumped in and a polymerization temperature of 60° C was realized while stirring (250 rpm). The pressure was 140 atmospheres. Then 80 ml of a 0.5% aqueous solution of sodium dithionite were pumped in in such a manner that, first, 30 ml were added, then 10 ml were added at intervals of 15 minutes. After 80 minutes the pressure had dropped to 10 atmospheres. Further procedure was as described in Example 1. Yield: 320 g (80%). EXAMPLE 20

The procedure was as specified in Example 19 with an addition of 1.6 g of $CF_3CHBrCl$, which was added, dissolved in 10 ml $C_2Cl_3F_3$, before closing the autoclave — as described in Example 2. Reaction time and yield were as in Example 19.

The $VF_2$ polymers obtained in accordance with Examples 1 to 20 exhibited the following properties, from which the effect of the regulators used was clearly evident: When using the regulators according to the invention that melt flow numbers of the polyvinylidene fluorides produced were considerably higher than without the use of the regulators, and the reduced viscosities attained values at which they were measurable. Compare table 4.

EXAMPLE 21 (Comparison Example)

The autoclave of 10 liters described in Example 8 was filled with 7.9 liters of water freed from salt; another 100 ml remained for the dosing in of the initiator. The autoclave was closed and flushed three times under pressure with VF. Thereupon 1.75 kg VF were additionally pumped in by means of a diaphragm dosing pump, and the contents were heated to 75° C while stirring (200 rpm, wide blade stirrer). A pressure of 190 atmospheres was reached. The polymerization was initiated by additionally pumping in an aqueous solution of 2.0 AIBA. HCl and the remaining water was pumped in subsequently. After 110 minutes the pressure had dropped to 15 atmospheres. The autoclave was cooled, depressurized, opened, the PVF in the form of a dispersion was removed, precipitated with NaCl solution, filtered with suction, washed with water and dried at 70° C. Yield: 1.4 kg (80%); $\eta$ red (0.5% in cyclohexanone, 120° C) 225 ml/g, molecular weight: not measurable due to insufficient solubility.

EXAMPLE 22

Example 21 was repeated by adding 20 g $CF_3CHBrCl$ (1.14% by weight, based on VF) prior to polymerization as in Examples 9 to 11. Reaction time: 120 minutes, yield: 1.4 kg, $\eta$ red 50 ml/g, $M_n$ (at 100° in dimethylformamide, estimated gelchromatographically) 33,000.

EXAMPLE 23 (Comparison Example)

The autoclave of a capacity of 2 liters described in Example 1 was filled with 1.4 liters of water freed from salt, subsequently closed and flushed with VF, and then 40 g of hexafluoropropylene (pressed in from the heated steel bottle placed on the scales) and 310 g VF were introduced. Thereupon, the contents were heated to 85° C while stirring (280 rpm), with the pressure attaining a level of 120 atmospheres. The polymerization was initiated with 0.52 g AIBA . HCl. After 90 minutes the pressure dropped to 30 atmospheres. Following working up as in Example 1, 300 g (86%) of copolymer were obtained, which has a viscosity $\eta$ red (120° C, 0.5% in cyclohexanone) of 170 ml/g.

EXAMPLE 24

Example 23 was repeated, the only difference being that 1.75 g (0.5%, based on the monomer) $CF_3CHBrCl$, dissolved in 10 ml $C_2F_3Cl_3$, were added prior to polymerization. Reaction time 100 min., yield: 290 g (82%), $\eta$ red: 115 ml/g.

EXAMPLE 25 (Comparison Example)

The autoclave of a capacity of 2 liters described in Example 1 was filled with 1.5 liters of water freed from salt, 0.4 g APFO and 1.6 g of potassium persulfate, subsequently closed and flushed three times with $VF_2$, and then 240 g (1.6 mols) of hexafluoropropylene and 160 g (2.5 mols) of $VF_2$ were introduced. The contents were heated to 90° C while stirring (250 rpm), and a pressure of 120 atmospheres was reached. Then 70 ml of a 0.5% aqueous solution of $NaHSO_3$ were pumped in in such a manner that, first, 20 ml were added, then 25 ml after 10 minutes and another 25 ml after 20 minutes. After 30 minutes the pressure had dropped to 35 atmospheres. The copolymer dispersion was taken out of the autoclave, precipitated with NaCl solution, and then the rubbery product was thoroughly washed with water. After drying at 70° C, the yield was 240 g (60%). The viscosity $\eta$ red (31° C, 0.5% in acetone) was 91 ml/g.

EXAMPLE 26

Example 25 was repeated, the only difference being that 2.0 g (0.5% based on monomers) $CF_3CHBrCl$, was dissolved in 10 ml $C_2F_3Cl_3$, were added prior to polymerization. Reaction time: 30 min., yield: 230 g (58%), $\eta_{red}$: 54 ml/g.

EXAMPLE 27

Example 2 above was repeated except that instead of employing $CF_3CHBrCl$, there was employed 10.0 g (2.5%) of $CF_2BrCl$. The gaseous regulator was introduced into the autoclave from a small pressure vessel together with $VF_2$. In all other respects the manner of Example 2 was followed. After 110 minutes there was obtained 360 g (90%) of $PVF_2$ polymer. The polymer had a reduced viscosity ($\eta_{red}$) of 64 ml/g. The melt number was determined to be 32.2.

EXAMPLE 28

The procedure of Example 1 was repeated except that 20 g (5%) of $CF_2BrCl$ were employed. After a reaction period of 145 minutes there was obtained at a yield of 91% a $PVF_2$ polymer having a reduced viscosity $\eta_{red}$ of 36 ml/g and a melt number of 59.

EXAMPLE 29

The procedure of Example 2 was repeated except that 0.4 g (0.1%) of tetrabromomethane was employed as polymerization regulator. The polymerization was commenced employing 0.6 g of AIBA.HCl. Otherwise the polymerization was conducted as reported in Example 2 above. After 2 hours, the experiment was terminated without any polymerizaton.

EXAMPLE 30

The procedure of Example 29 was repeated employing 0.2 g (0.05%) $CBr_4$. After no reaction had taken place with 0.6 g AIBA.HCl, 0.6 initiator was again added after 1 and 2 hours, respectively. No polymerization took place. After 3 hours the experiment was terminated without any polymerization having taken place.

EXAMPLE 31

In the manner of Example 29, a polymerization of $VF_2$ was attempted employing 4 g (1%) of carbon tetrachloride as polymerization regulator. The manipulative technique was as in Example 29. After 2.5 hours, 324 g (81%) of polyvinylidene fluoride was recovered. The material had a reduced viscosity of 80 ml/g and a melt flow number of 20.6.

EXAMPLE 32

Example 31 was repeated employing 2 g (0.5%) $CCl_4$. A yield of 350 g (87%) of polyvinylidene fluoride was obtained having a reduced viscosity of 94 ml/g with a melt flow number of 14.7. In obtaining the melt flow number, samples were pressed for 5 minutes at 260° C. They discolored and revealed a brownish color. The same discoloration was obtained when $PVF_2$ from example 31 was treated in the same manner. It was concluded that this regulator was not suitable for the regulation of polyvinylidene fluoride polymerization, for it did not meet all standards of a good chain transfer Table 4

| Example | Regulator | a) $\eta$ red ml/g | b) MFN | c) $M_{\mu}$ mkp | d) $M_n$ |
|---|---|---|---|---|---|
| 1 | — | x | 5.7 | xx | XXX |
| 2 | $_3$CHBrCl (0.95) | 122 | 15.8 | | |
| 3 | $CF_3CHBr_2$ (0.88) | 92 | 20.1 | 0.9 | |
| 4 | $CF_2BrCF_2Br$ (3.5) | 106 | 18.0 | | |
| 5 | $CF_2BrCF_2Br$ (1.75) | 226 | 9.9 | 2.8 | |
| 6 | $CF_3CFBrCF_2Br$ (3.5) | 110 | 16.2 | | |
| 7 | $CHFBrCH_2Br$ (0.9) | 200 | 9.2 | | |
| 8 | — | x | 5.7 | xx | xxx |
| 9 | $_3$CHBrCl (0.4) | 65 | 28.3 | 0.65 | 93 000 |
| 10 | $CH_3CH_2I$ (0.3) | 131 | 12.0 | 2.1 | 140 000 |
| 11 | $CF_2BrCF_2Br$ (1.6) | 55 | 37.8 | 0.3 | |
| 12 | — | x | 8.0 | xx | xxx |
| 13 | $_3$CHBrCl (0.2) | 87 | 17.6 | 1.25 | 106 000 |
| 14 | $CF_3CHBrCl$ (0.16) | 130 | 11.5 | 2.0 | 152 000 |
| 15 | $CF_3CHBrCl$ (0.12) | 136 | 10.0 | 2.4 | |
| 16 | $CF_3CH_2I$ (0.2) | 110 | 11.5 | 1.95 | |
| 17 | — | 104 | 12.6 | | 125 000 |
| 18 | $_2BrCF_2Br$ (0.4) | 66 | 21.6 | | 90 000 |
| 19 | — | x | 6.0 | | |
| 20 | $_3$CHBrCl (0.4) | 120 | 13.1 | | |

Explanations regarding table 4:
a) 0.5% in cyclohexanone, measuring temperature 120° C
b) melt flow number
c) torsional moment in the Brabender plastograph at 270° C
d) numerical mean, estimated by means of gelchromatography (100° C, dimethylformamide)
x = incompletely dissolved
xx = not completely plastified
xxx = not measurable agent in that it provided a polymer which was not thermally stable.

EXAMPLE 33

In the manner of Example 29 above, 4 g (1%) of bromotetrachloromethane were employed as regulator. After adding 0.6 g AIBA.HCl, no polymerization had taken place. After about 1 hour, 0.6 g initiator was again added to the reaction mixture. Only after a period of 90 minutes did polymerization commence. The period of operation for the entire experiment was 4 hours. Eventually, a yield of 420 g (80%) of polyvinylidene fluoride polymer was obtained. The polymer had a reduced viscosity of 100 ml/g and a melt flow number of 18.3. The melt flow number was determined in the manner described above. The samples were also discolored, proving that the bromotetrachloromethane did not provide a polymer of the desired thermal stability.

What is claimed is:

1. In a process for the preparation of thermoplastically workable fluoro-polyolefins and their copolymers by polymerization or copolymerization of fluorine-containing olefins in the aqueous phase in the presence of a water-soluble radical-forming catalyst and a polymerization regulator, the improvement which comprises employing as such regulator a halogenated hydrocarbon having one carbon atom and having at least three halogen atoms of which at least one is fluorine and at least another is bromine or iodine, said regulator being employed in an amount between 0.05 and 10% by weight.

2. A process according to claim 1 wherein the regulator is selected from the group consisting of $CHFBr_2$, $CF_2Br_2$, $CHF_2Br$, $CBr_3F$, $CHFI_2$, $CHFBrCl$, $CFBrCl_2$, and $CFBr_2Cl$.

3. A process according to claim 1 wherein said polymerization regulator is $CF_2BrCl$.

4. A process according to claim 1 wherein said polymerization regulator is dibromodifluoromethane.

* * * * *

UNITED STATES PATENT AND TRADEMARK OFFICE
CERTIFICATE OF CORRECTION

PATENT NO. : 4,000,356
DATED : December 28, 1976
INVENTOR(S) : Gregor Weisgerber et al It is certified that error appears in the above-identified patent and that said Letters Patent are hereby corrected as shown below:

Column 2, line 59, insert --or-- between "Hydrogen" and "Fluorine".

Column 7, line 56, leave space between Example 19 and "EXAMPLE 20".

Column 9, Table 4, in the column headed "Regulator", at Examples 2, 9, 13, 18, and 20, each of the formulae should begin -- CF --.

Signed and Sealed this

Tenth Day of May 1977

[SEAL]

Attest:

RUTH C. MASON
Attesting Officer

C. MARSHALL DANN
Commissioner of Patents and Trademarks